US008947483B1

(12) United States Patent
Nakajima et al.

(10) Patent No.: US 8,947,483 B1
(45) Date of Patent: Feb. 3, 2015

(54) PRINTER AND MARK DETECTION METHOD

(71) Applicant: Fujitsu Component Limited, Tokyo (JP)

(72) Inventors: Takashi Nakajima, Tokyo (JP); Yukihiro Mori, Tokyo (JP)

(73) Assignee: Fujitsu Component Limited, Tokyo (JP)

( * ) Notice: Subject to any disclaimer, the term of this patent is extended or adjusted under 35 U.S.C. 154(b) by 0 days.

(21) Appl. No.: 14/264,346

(22) Filed: Apr. 29, 2014

(30) Foreign Application Priority Data

Jul. 24, 2013 (JP) ................................ 2013-153568

(51) Int. Cl.
*B41J 2/315* (2006.01)
*B41J 11/00* (2006.01)
*G01B 11/00* (2006.01)

(52) U.S. Cl.
CPC ............ *B41J 11/0095* (2013.01); *G01B 11/00* (2013.01)
USPC .......................................................... 347/221

(58) Field of Classification Search
USPC ............ 347/7, 14, 16, 19, 37, 211, 213–215, 347/217–219, 221, 222; 400/76, 578, 583, 400/611
See application file for complete search history.

(56) References Cited

U.S. PATENT DOCUMENTS 5,250,957 A * 10/1993 Onozato ........................ 347/37
5,623,290 A * 4/1997 Iida et al. ........................ 347/37
5,900,888 A * 5/1999 Kurosawa ........................ 347/14
6,076,911 A * 6/2000 Watanabe ........................ 347/16
6,244,680 B1 * 6/2001 Truffaut et al. ................... 347/7
6,729,711 B1 * 5/2004 Hashimoto et al. ............ 347/19
7,942,487 B2 * 5/2011 Sudo et al. ........................ 347/7
7,942,491 B2 * 5/2011 Fukasawa et al. ............. 347/16
8,585,303 B2 * 11/2013 Imamura et al. ................ 400/76
2011/0217108 A1 9/2011 Imamura et al.

FOREIGN PATENT DOCUMENTS

JP 2011-178147 9/2011
JP 2012-30435 2/2012

OTHER PUBLICATIONS

Patent Abstracts of Japan, Publication No. 2011-178147, Published Sep. 15, 2011.
Patent Abstracts of Japan, Publication No. 2012-030435, Published Feb. 16, 2012.

* cited by examiner

*Primary Examiner* — Kristal Feggins
(74) *Attorney, Agent, or Firm* — Staas & Halsey LLP

(57) ABSTRACT

A printer includes: a sensor; a calculation unit that calculates an average value of mark levels and a permissible range in accordance with the average value, the mark levels being output levels of the sensor that has read a mark on a sheet a given number of times; a setting unit that, when the mark levels read the given number of times fall within the permissible range, sets a middle value between a white level and the average value as a determination value of existence or non-existence of a next mark, the white level being an output level of the sensor when a non-marking domain of the sheet is read; and a determination unit that determines that the next mark has been detected when a mark level at the time of reading of the next mark is less than the determination value of existence or nonexistence of the next mark.

12 Claims, 12 Drawing Sheets

PRINTER AND MARK DETECTION METHOD

CROSS-REFERENCE TO RELATED APPLICATION

This application is based upon and claims the benefit of priority of the prior Japanese Patent Application No. 2013-153568 filed on Jul. 24, 2013, the entire contents of which are incorporated herein by reference.

FIELD

A certain aspect of the embodiments is related to a printer and a mark detection method.

BACKGROUND

There has been known a thermal printer that detects a mark on a sheet and positions the sheet (see Japanese Laid-open Patent Publication No. 2012-30435). In the thermal printer, a threshold value for mark detection is updated in consideration of discoloration of the sheet. There has been known a thermal printer which updates a threshold value for detecting a positioning mark on the paper according to the situation of light from the outside (see Japanese Laid-open Patent Publication No. 2011-178147).

SUMMARY

According to an aspect of the present invention, there is provided a printer, including: a sensor; a calculation unit that calculates an average value of mark levels and a permissible range in accordance with the average value, the mark levels being output levels of the sensor that has read a mark on a sheet a given number of times; a setting unit that, when the mark levels read the given number of times fall within the permissible range, sets a middle value between a white level and the average value as a determination value of existence or nonexistence of a next mark, the white level being an output level of the sensor when a non-marking domain of the sheet is read; and a determination unit that determines that the next mark has been detected when a mark level at the time of reading of the next mark is less than the determination value of existence or nonexistence of the next mark.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the above-mentioned conventional methods of the mark detection, the influence on the mark detection by vibration of the sheet is not taken into consideration. For example, the sheet is vibrating at the time of conveyance, and hence a sensor level at the time of the mark detection also moves up and down. Therefore, in order to detect the mark with high accuracy, it is necessary to remove the influence on the mark detection by vibration of the sheet from the detected sensor level.

A description will now be given of embodiment of the present invention with reference to the drawings.

Figure 1:
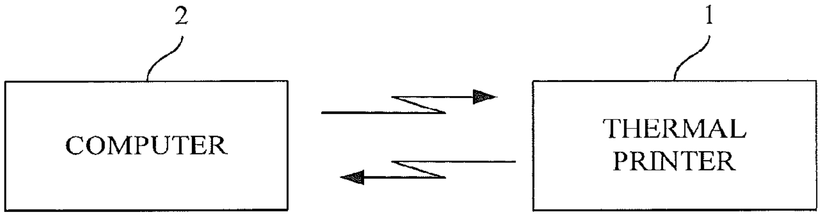
FIG. 1 is a block diagram illustrating a connection relationship between an information processing apparatus and a printer according to a present embodiment.

FIG. 1 is a block diagram illustrating a connection relationship between an information processing apparatus and a printer according to a present embodiment. The printer according to the present embodiment is a thermal printer 1, for example. The printer according to the present embodiment needs to read marks on a paper and perform positioning of a sheet, and is not limited to the thermal printer. The marks for positioning the paper may be printed at one side of the paper, and may be printed at both sides. In the present embodiment, the marks are printed on the paper at the predetermined intervals (for example, 10 cm). A width direction of each mark is parallel to a sheet feeding direction.

In an example of FIG. 1, an information processing apparatus is a computer 2, and may be a cell phone or a tablet terminal. The computer 2 communicates data with the thermal printer 1. For example, the computer 2 transmits print data to the thermal printer 1, and the thermal printer 1 prints the print data on a recording sheet.

Figure 2:
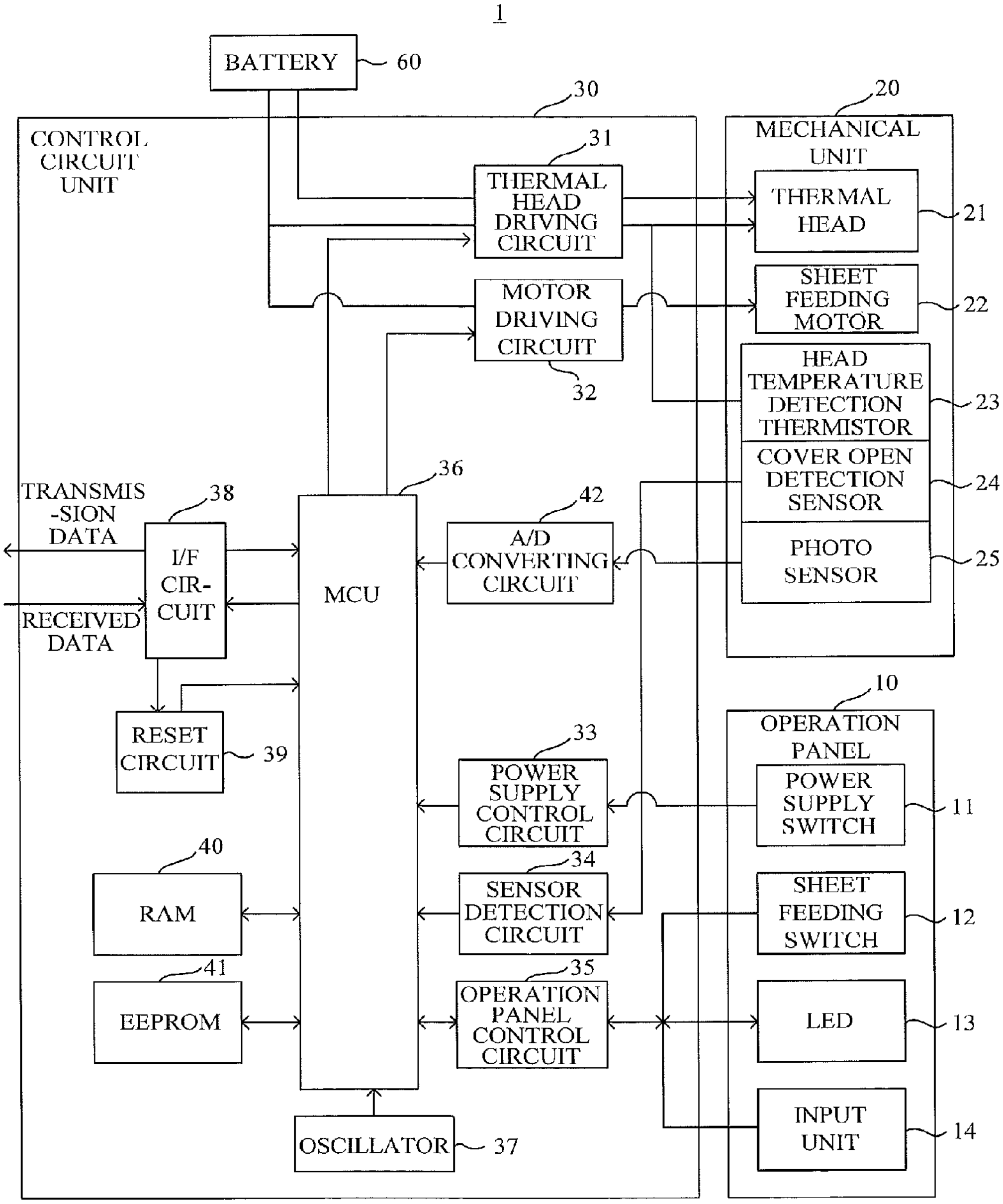
FIG. 2 is a block diagram illustrating the configuration of a thermal printer.

FIG. 2 is a block diagram illustrating the configuration of the thermal printer. As illustrated in FIG. 2, the thermal printer 1 includes an operation panel 10, a mechanical unit 20, and a control circuit unit 30, and is connected to a battery 60.

A power supply control circuit 33 and a MCU (Micro Control Unit) 36 are provided in the control circuit unit 30. The power supply control circuit 33 is connected to the MCU 36, and controls an electric power supplied from the battery 60 to the control circuit unit 30. The MCU 36 controls the whole thermal printer. The battery 60 is a supply source of the power supply of the thermal printer used for the present embodiment.

The operation panel 10 includes a power supply switch 11, a sheet feeding switch 12, a LED (Light Emitting Diode) 13, and an input unit 14. The power supply switch 11 is operated by a user, transmits a control signal for turning on/off the power supply to the power supply control circuit 33 in the control circuit unit 30, and controls turning on/off the power supply. A push-button switch is used as the power supply switch 11.

The sheet feeding switch 12 is a switch for the sheet feeding operation by a user. The sheet feeding switch 12 transmits a command for sheet feeding to the MCU 36 via an operation panel control circuit 35. The LED 13 emits light according to an instruction from the MCU 36 via the operation panel control circuit 35. Here, instead of the LED 13, a liquid-crystal-display panel which displays information from the MCU 36 may be mounted on the operation panel 10. The LED 13 and the liquid-crystal-display panel function as a notification unit. The input unit 14 which functions as a changing unit inputs data (e.g. a threshold value for detecting existence of sheet, a threshold value for detecting nonexistence of sheet or the like) to the MCU 36 via the operation panel control circuit 35.

The mechanical unit 20 includes a thermal head 21, a sheet feeding motor 22, a head temperature detection thermistor 23, a cover open detection sensor 24 and a photo sensor 25 as an optical sensor.

The thermal head 21 selectively gives an electric potential to heating resistors located in a line to generate heat, and prints a character and image data on a sheet, such as a thermal paper which reacts with this heat. The sheet feeding motor 22 is composed of a stepping motor, and is used to feed the sheet. The head temperature detection thermistor 23 detects the temperature of the thermal head 21. The cover open detection sensor 24 detects opened and closed states of a cover which covers the mechanical unit 20. The photo sensor 25 is an optical reading sensor used for detection of existence or non-existence of the marks or the sheet, and has a light emitting element and a light receiving element. The light emitting element emits light to the sheet. The light receiving element receives reflected light from the sheet, and outputs the reflected light to an A/D converting circuit 42 as an analog signal. In order to cope with a case where the marks are printed at both sides of the sheet, the mechanical unit 20 may have a plurality of photo sensors 25. In this case, the photo sensors 25 are arranged so as to be opposed to a front face and a rear face of the sheet.

The control circuit unit 30 includes a thermal head driving circuit 31, a motor driving circuit 32, a sensor detection circuit 34, an operation panel control circuit 35, an oscillator 37, an interface (I/F) circuit 38, a reset circuit 39, a RAM (Random Access Memory) 40, an EEPROM (Electrically Erasable Programmable Read-Only Memory) 41 and the A/D converting circuit 42 in addition to the power supply control circuit 33 and the MCU 36. For example, the MCU 36 functions a calculation unit, a setting unit, a determination unit, and first to fourth detection units.

The thermal head driving circuit 31 drives the thermal head 21 in accordance with an instruction from the MCU 36. The motor driving circuit 32 supplies a driving current to the sheet feeding motor 22 in accordance with an instruction from the MCU 36. The sensor detection circuit 34 outputs a signal detected by the cover open detection sensor 24 to the MCU 36. The operation panel control circuit 35 controls turning on/off the LED 13 in accordance with an instruction from the MCU 36, and outputs a control signal from the sheet feeding switch 12 to the MCU 36. Moreover, the operation panel control circuit 35 outputs data from the input unit 14 to the MCU 36.

The oscillator 37 supplies a clock signal with a predetermined frequency to the MCU 36. The interface (I/F) circuit 38 receives print data and commands from the computer 2, and replies a reply signal corresponding to a command from the computer 2, to the computer 2. When the thermal printer 1 is turned off, the reset circuit 39 outputs a reset request signal to the MCU 36 and changes the thermal printer 1 into an initial state.

The RAM 40 is a volatile memory, and temporarily stores received data inputted from the computer 2, or temporarily stores data in the middle of processing. The EEPROM 41 is a nonvolatile memory, and builds in software which the MCU 36 performs. The software is read according to a request from the MCU 36. The A/D converting circuit 42 converts an analog signal from the photo sensor 25, into a digital signal, and outputs the converted digital signal to the MCU 36. That is, the MCU 36 receives an output value (a level) from the photo sensor 25 via the A/D converting circuit 42.

Figure 12:
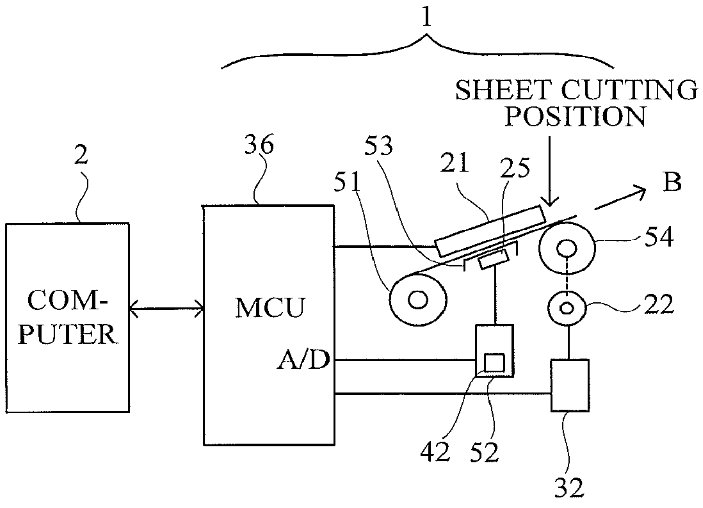
FIG. 12 is a diagram illustrating the configuration of the thermal printer.

FIG. 12 is a diagram illustrating the configuration of the thermal printer. The same configurations as those of FIG. 2 are denoted by the identical reference number.

The thermal printer 1 is connected to the computer 2 as the information processing apparatus, and has the MCU 36. Moreover, the thermal printer 1 has the thermal head 21, the photo sensor 25, the motor driving circuit 32, a thermal paper 51, a sensor driving circuit 52, a sheet guide 53, the sheet feeding motor 22, and a platen 54. The sensor driving circuit 52 includes the A/D converting circuit 42. The MCU 36 is connected to the photo sensor 25, the sensor driving circuit 52, and the motor driving circuit 32. The motor driving circuit 32 drives the sheet feeding motor 22 according to a driving signal from the MCU 36. The sheet feeding motor 22 rotates the platen 54 which pushes the thermal paper 51 against the thermal head 21. The thermal paper 51 is conveyed in the direction of an arrow B by the rotation of the platen 54. The thermal head 21 is arranged so as to be opposed to the platen 54, the photo sensor 25, and the sheet guide 53. The thermal head 21 applies heat to the thermal paper 51 based on the print data from the MCU 36, and prints a character and image data on the thermal paper 51. The MCU 36 receives the output value (the level) from the photo sensor 25 via the A/D converting circuit 42, and drives the photo sensor 25 via the sensor driving circuit 52. The photo sensor 25 is attached to a central part of the sheet guide 53. The sheet guide 53 to which the photo sensor 25 is attached is arranged between the platen 54 and the roll-shaped thermal paper 51. A sheet cutting position is set near an end of the thermal head 21 by the side of the platen 54.

Figure 3:
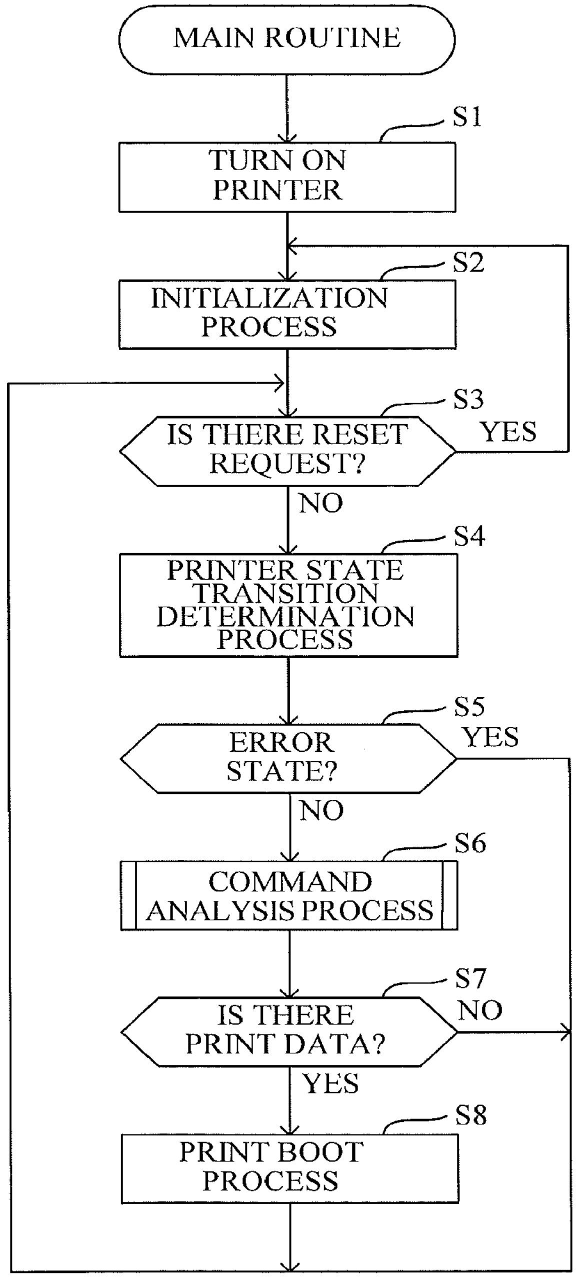
FIG. 3 is a flowchart illustrating an example of a process of a main routine executed by a MCU (Micro Control Unit)

FIG. 3 is a flowchart illustrating an example of a process of a main routine executed by the MCU 36.

First, the thermal printer 1 is turned on by the operation of the power supply switch 11 (step S1), and the MCU 36 performs an initialization process (step S2). In the initialization process, various information required for operation of the thermal printer 1 is set to an internal RAM of the MCU 36. Here, each of values of the various information set to the internal RAM changes in accordance with the operation of the thermal printer 1.

Next, the MCU 36 determines whether there is a reset request from the reset circuit 39 (step S3). When there is the reset request (YES in step S3), the procedure returns to step S2. When there is not the reset request (NO in step S3), the MCU 36 performs a printer state transition determination process (step S4). Specifically, the MCU 36 determines whether the state of the thermal printer 1 is changed. When the state of the thermal printer 1 is changed, the MCU 36 notifies the computer 2 of the state of the thermal printer 1.

Next, the MCU 36 determines whether the thermal printer 1 is in an error state (step S5). When the thermal printer 1 is in the error state (YES in step S5), the procedure returns to step S3.

When the thermal printer 1 is not in the error state (NO in step S5), if there is received data from the computer 2, the MCU 36 performs a command analysis process for extracting and executing each command about printing from the received data (step S6). Here, although the received data from the computer 2 is received by a timer-interruption process and is stored into a predetermined domain, the explanation of this process is omitted.

Next, the MCU 36 determines whether the print data is included in the received data from the computer 2 (step S7). When the print data is not included in the received data (NO in step S7), the procedure returns to step S3. When the print data is included in the received data (YES in step S7), the MCU 36 performs a print boot process, and begins a print process (step S8). Specifically, the MCU 36 transmits the print data to the thermal head 21, sets the number of print steps, and performs printing by synchronizing the number of print steps with the number of steps of the sheet feeding motor 22 by the timer-interruption process.

Figure 4:
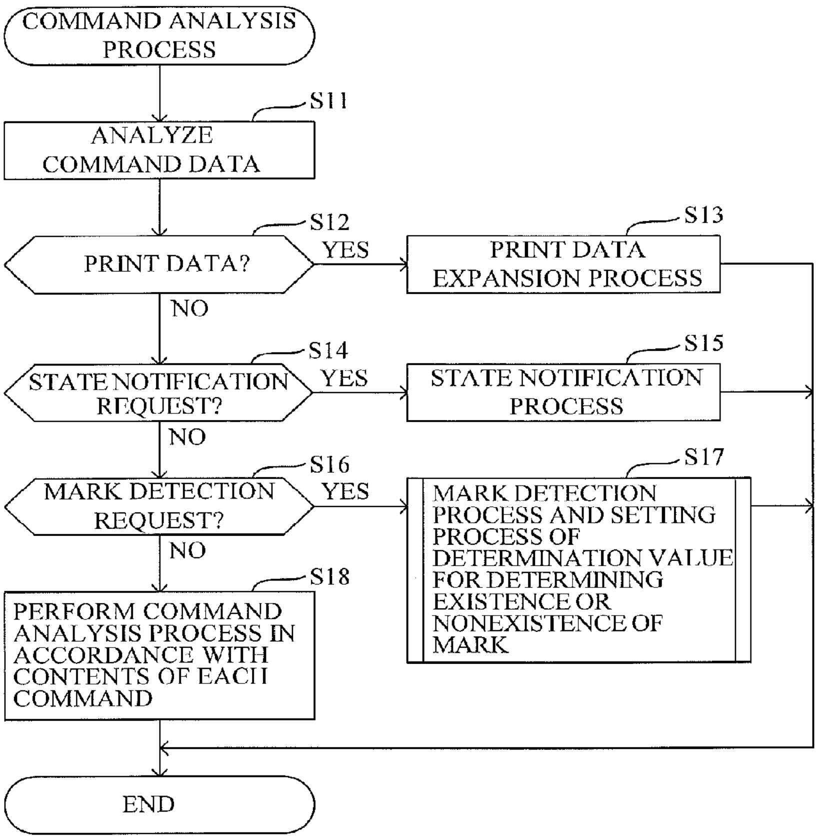
FIG. 4 is a flowchart illustrating a command analysis process of FIG. 3.

FIG. 4 is a flowchart illustrating the command analysis process of FIG. 3.

The MCU 36 analyzes command data received from the computer 2 (step S11). The MCU 36 determines whether the command data is the print data (step S12). When the command data is the print data (YES in step S12), the MCU 36 performs a print data expansion process in which the command data is converted into the print data which can be used by the thermal head 21 (step S13), and the present process is terminated.

When the command data is not the print data (NO in step S12), the MCU 36 determines whether the command data is a state notification request (step S14). When the command data is the state notification request (YES in step S14), the MCU 36 performs a state notification process in which the state of the thermal printer 1 is notified to the computer 2 (step S15), and the present process is terminated.

When the command data is not the state notification request (NO in step S14), the MCU 36 determines whether the command data is a mark detection request (step S16). When the command data is the mark detection request (YES in step S16), the MCU 36 performs a mark detection process and a setting process of a determination value for determining existence or nonexistence of the mark, as described later (step S17), and the present process is terminated. When the command data is not the mark detection request (NO in step S16), the MCU 36 performs a command analysis process in accordance with contents of each command (step S18), and the present process is terminated.

Figure 5:
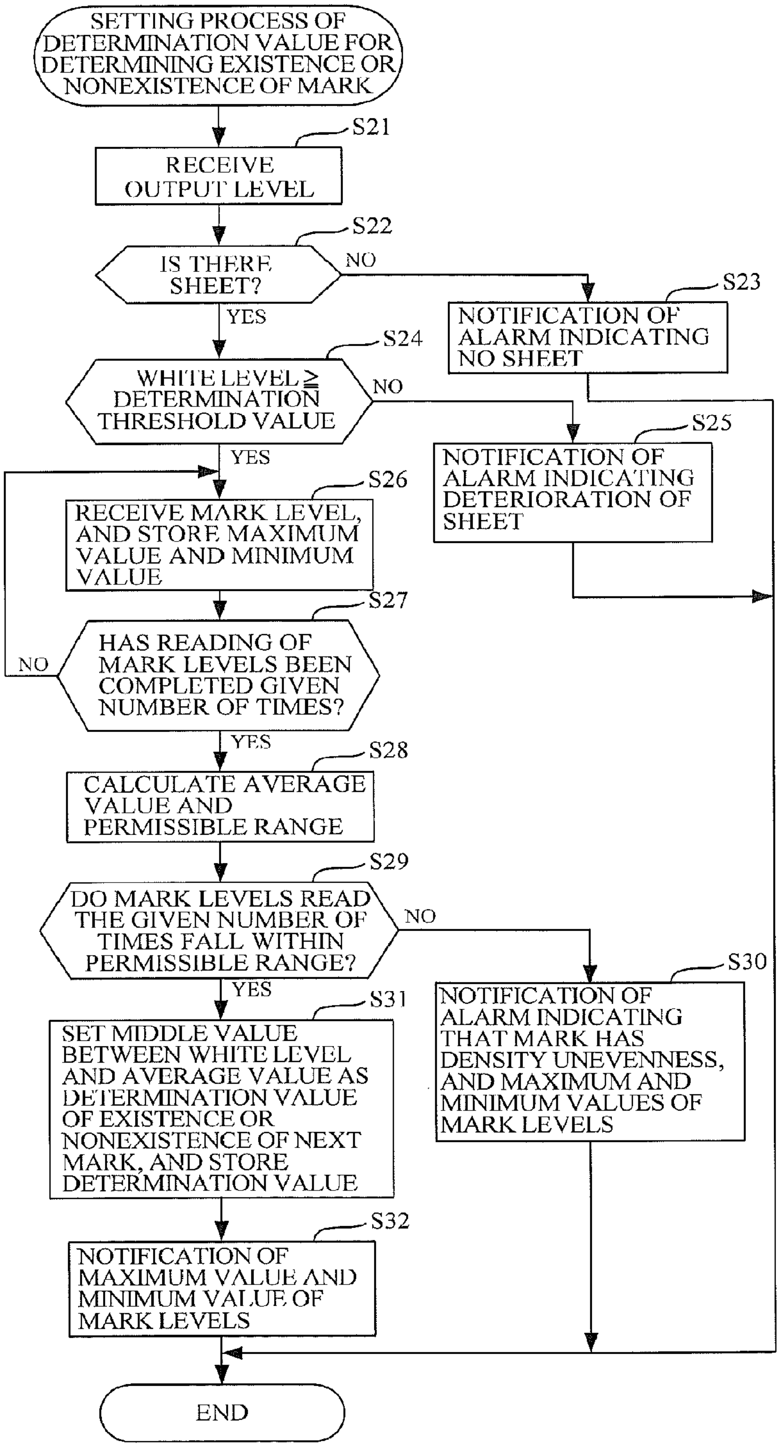
FIG. 5 is a flowchart illustrating a setting process of a determination value for determining existence or nonexistence of a mark of FIG. 4.
Figure 6A:
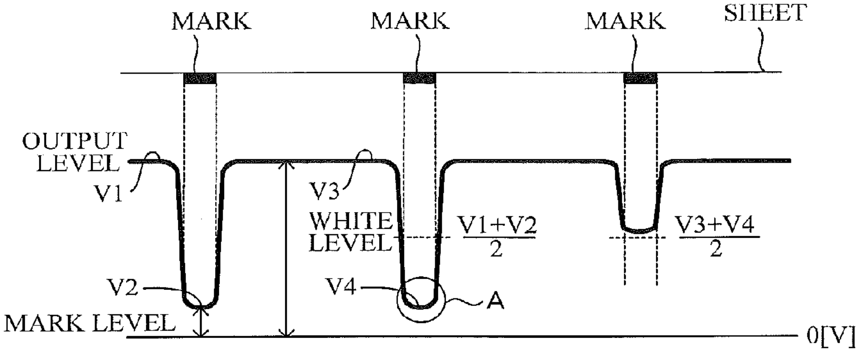
FIG. 6A is a diagram illustrating a relationship between an output level of a photo sensor and the mark on the sheet.
Figure 6B:
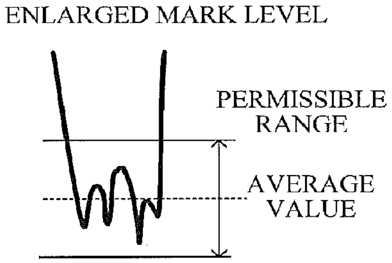
FIG. 6B is a diagram illustrating the output level of the photo sensor (i.e., a mark level) when the mark is read.

FIG. 5 is a flowchart illustrating the setting process of the determination value for determining existence or nonexistence of the mark. FIG. 6A is a diagram illustrating a relationship between the output level of the photo sensor and the mark on the sheet. FIG. 6B is a diagram illustrating the output level of the photo sensor (i.e., the mark level) when the mark is read. Moreover, FIG. 6B is an enlarged view of a region "A" in FIG. 6A.

In FIG. 5, reading the sheet is begun, and the MCU 36 receives an output level of the photo sensor 25 via the A/D converting circuit 42 (step S21). Next, the MCU 36 determines whether the sheet exists, based on the output level of the photo sensor 25 (step S22).

Figure 7:
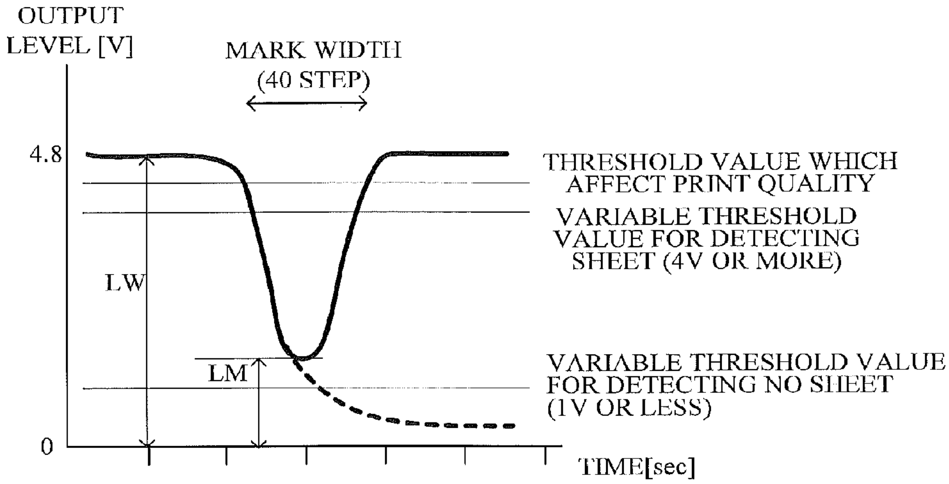
FIG. 7 is a diagram illustrating an example of an output level of the photo sensor.

A determination method of existence or nonexistence of the sheet is explained with reference to FIG. 7. FIG. 7 is a diagram illustrating an example of the output level of the photo sensor. A solid line of FIG. 7 denotes the output level of the photo sensor 25 when the mark is read. A dashed line of FIG. 7 denotes the output level of the photo sensor 25 when there is no sheet. Here, the sheet in which the width of the mark is 5 mm is used. For example, the sheet feeding motor 22 feeds the sheet 0.125 mm per one step. In this case, 40 steps of the sheet feeding motor 22 correspond to 5 mm of the width of the mark.

When the photo sensor 25 reads a non-marking domain (i.e., a white domain on the sheet), the output level of the photo sensor 25 is about 4.8V. This output level is called "white level (LW)". Then, when the mark is read, the output level of the photo sensor 25 decreases gradually in accordance with the sheet feeding. Moreover, when there is no sheet, the output level of the photo sensor 25 decreases. This is because the reflectance of light decreases on the mark or a sheet feeding path. A minimum value of the output level of the photo sensor 25 when the mark is read is set as "LM".

Although the output level of the photo sensor 25 decreases during the mark reading, the output level of the photo sensor 25 returns to an initial output level (i.e., the white level) after the mark reading, as illustrated in FIG. 7. On the contrary, when there is no sheet, the output level of the photo sensor 25 does not return to the initial output level (i.e., the white level), and further decreases more than the minimum value LM at the time of the mark reading.

In the present embodiment, a threshold value for detecting the sheet is set to 4.0V as an initial value, and a threshold value for detecting no sheet is set to 1.0V as an initial value, for example. In this case, when the output level of the photo sensor 25 is equal to or more than 4.0V, the MCU 36 determines that there is a sheet. When the output level of the photo sensor 25 is equal to or less than 1.0V, the MCU 36 determines that there is no sheet. The threshold value for detecting the sheet and the threshold value for detecting no sheet are stored into the RAM 40 or the EEPROM 41. The threshold value for detecting the sheet and the threshold value for detecting no sheet can be changed by the input unit 14 or the computer 2.

Since the white level is about 4.8V when there is the sheet, the threshold value for detecting the sheet can be set to 4.6V equal to or less than the white level, for example. In this case, when the output level (i.e., the white level) of the photo sensor 25 is equal to or more than 4.6V, the MCU 36 determines that there is the sheet. On the contrary, when the sheet has deteriorated by discoloration, an amount of reflected light from the sheet decreases, and the output level of the photo sensor 25 which has read the white domain of the sheet is set to 4.5V, for example, and may not reach the threshold value for detecting the sheet. In such a case, the threshold value for detecting the sheet may be changed to 4.3V from 4.6V, or the MCU 36 may notify the computer 2 of an alarm indicating deterioration of the sheet, as described later. Moreover, when the sheet cannot be replaced immediately, the MCU 36 may increase an energy to be applied to the sheet (for example, the MCU 36 may increase the temperature of the thermal head 21) in order to suppress the decrease of a print density.

Moreover, when the output level of the photo sensor 25 decreases more than the threshold value (e.g. 1.0V) for detecting no sheet, the MCU 36 determines that there is no sheet. When the output level of the photo sensor 25 at the time of sheet replacement is 0.3V, the threshold value for detecting no sheet may be changed to 0.6V from 1.0V.

Figure 11:
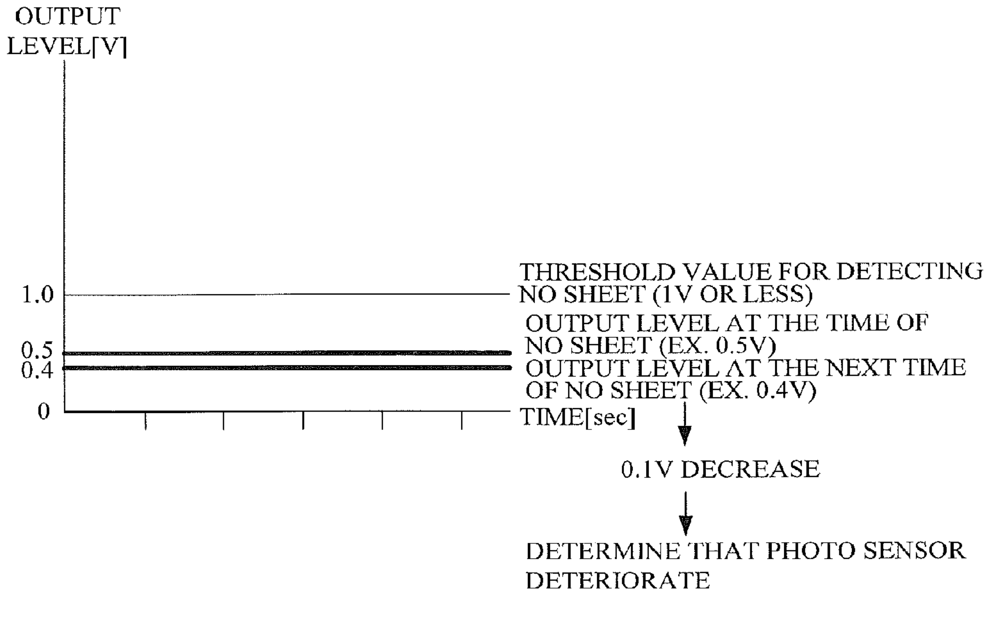
FIG. 11 is a diagram illustrating an example of an output level of the photo sensor at the time of no sheet.

The output level of the photo sensor 25 is changed by reflection of the light from a surrounding structure, or deterioration of the photo sensor 25. Especially, when the thermal printer 1 is used for a long time, the photo sensor 25 deteriorates. The MCU 36 may detect deterioration of the photo sensor 25 from the output level of the photo sensor 25 in the case of no sheet (i.e., when the sheet is not set). When the output level of the photo sensor 25 at the time of no sheet is 0.5V and the output level of the photo sensor 25 at the next time of no sheet is 0.4V as illustrated in FIG. 11, the MCU 36 determines that the output level of the photo sensor 25 decreases by 0.1V (i.e., the photo sensor 25 deteriorates), and may notify the computer 2 of deterioration information indicating that the output level of the photo sensor 25 decreases by 0.1V, for example. That is, the MCU 36 can detect deterioration of the photo sensor 25 based on the read output level of the photo sensor 25, and the history of the output level of the photo sensor 25.

Referring to FIG. 5, when there is no sheet (NO in step S22), the MCU 36 notifies the computer 2 of an alarm indicating no sheet (step S23), and the present process is terminated. Alternatively, the LED 13 may notify a user of the alarm indicating no sheet.

On the contrary, when there is the sheet (YES in step S22), the MCU 36 determines whether the output level (i.e., the white level) of the photo sensor 25 which has read the non-marking domain is equal to or more than a determination threshold value for determining whether the print quality is affected (step S24). Here, deterioration of the sheet by discoloration (e.g. yellow tint) of the sheet is detected. It is assumed that the white level of the sheet which does not deteriorate is 4.8V, for example. When the white level decreases about 10% by discoloration of the sheet (i.e., the white level is 4.3V), the print density also decreases from 1.0 (i.e., a normal value) to 0.7. In this case, even if data is printed on the sheet, it is hard to see the data. Therefore, the threshold value which affects the print quality is made into 95% of a normal white levels (about 4.6V), for example. The threshold value which affects the print quality is stored into the RAM 40 and the EEPROM 41 in advance. When the white level is less than the threshold value which affects the print quality, the MCU 36 determines that the sheet has deteriorated. On the contrary, when the white level is equal to or more than the determination threshold value for determining whether print quality is affected, the MCU 36 determines that the sheet does not affect the print quality and is normal.

When the white level is less than the determination threshold value for determining whether the print quality is affected (NO in step S24), the MCU 36 notifies the computer 2 of an alarm indicating deterioration of the sheet (step S25), and the present process is terminated. In this case, even if data is printed on the sheet, it is hard to see the data. Therefore, the MCU 36 can recommends the replacement of the sheet to a user through the computer 2. Alternatively, the LED 13 may notify the user of the alarm indicating deterioration of the sheet.

When the white level is equal to more than the threshold value for determining whether the print quality is affected (YES in step S24), the MCU 36 receives the output level of the photo sensor 25 (hereinafter, simply referred to as "a mark level") which reads the mark (step S26). When the received mark level is a maximum value of the mark levels, the MCU 36 stores the received mark level into the RAM 40 or the EEPROM 41 as the maximum value of the mark levels, and when the received mark level is a minimum value of the mark levels, the MCU 36 stores the received mark level into the RAM 40 or the EEPROM 41 as the minimum value of the mark levels (step S26). Here, since the photo sensor 25 reads mark levels for one mark two or more times, as described later, the maximum value and the minimum value of the mark levels are suitably updated whenever each mark level is read.

Next, the MCU 36 determines whether the reading of the mark levels of a given number of times (i.e., multiple times) for one mark has been completed (step S27). For example, the given number of times is a number obtained by dividing the width of a single mark by a feeding distance per one step of the sheet feeding motor 22. When the reading of the mark levels of the given number of times for one mark has not been completed (NO in step S27), the procedure returns to step S26.

When the reading of the mark levels of the given number of times for one mark has been completed (YES in step S27), the MCU 36 calculates an average value and a permissible range of the mark levels which are read the given number of times, as illustrated in FIG. 6B (step S28). This permissible range is a range acquired by adding or subtracting a predetermined value to or from the average value calculated in step S28. When the average value of the mark levels which are read the given number of times is 0.8V and the predetermined value is 0.3V, for example, the permissible range is 0.5 to 1.1V.

Next, the MCU 36 determines whether all of the mark levels which are read the given number of times fall within the permissible range (step S29). Here, it is determined whether the variation of the mark levels falls within the permissible range.

When some mark levels which are read the given number of times do not fall within the permissible range (NO in step S29), the MCU 36 notifies the computer 2 of an alarm indicating that the mark has density unevenness, and the maximum value and the minimum value of the mark levels stored into the RAM 40 or the EEPROM 41 (step S30), and the present process is terminated. In this case, the MCU 36 can notify the user that the mark has density unevenness, through the computer 2. Therefore, before the thermal printer 1 stops by the abnormality of the sheet, the user can replace the sheet. Alternatively, the LED 13 may notify the user of the alarm indicating that the mark has density unevenness. When the liquid-crystal-display panel is mounted on the thermal printer 1 instead of the LED 13, the liquid-crystal-display panel displays the alarm indicating that the mark has density unevenness, and the maximum value and the minimum value of the mark levels.

When all of the mark levels which are read the given number of times fall within the permissible range (YES in step S29), the MCU 36 sets a middle value between the white level and the average value calculated in step S28 as a determination value of existence or nonexistence of a next mark, and stores the middle value into the RAM 40 or the EEPROM 41 (step S31). For example, in FIG. 6A, the determination value of existence or nonexistence of a central mark is a middle value between a white level V1 of a left mark and an average value V2 of the mark levels calculated in step S28 as a result of the reading of the left mark (i.e., (V1+V2)/2). The determination value of existence or nonexistence of a right mark is a middle value between a white level V3 of the central mark and an average value V4 of the mark levels calculated in step S28 from the reading of the central mark (i.e., (V3+V4)/2).

Finally, the MCU 36 notifies the computer 2 of the maximum value and the minimum value of the mark levels stored into the RAM 40 or the EEPROM 41 (step S32), and the present process is terminated. Thereby, the user can refer to the maximum value and the minimum value of the mark levels, and determine the replacement of the sheet.

In steps S26 to S31, the photo sensor 25 reads each mark multiple times, and the MCU 36 calculates the permissible range by using the average value of the mark levels read multiple times, and determines whether the read mark levels fall within the permissible range. Therefore, the false detection of the mark by the unevenness of the detection of the mark levels at the time of the sheet feeding can be suppressed.

Figure 8:
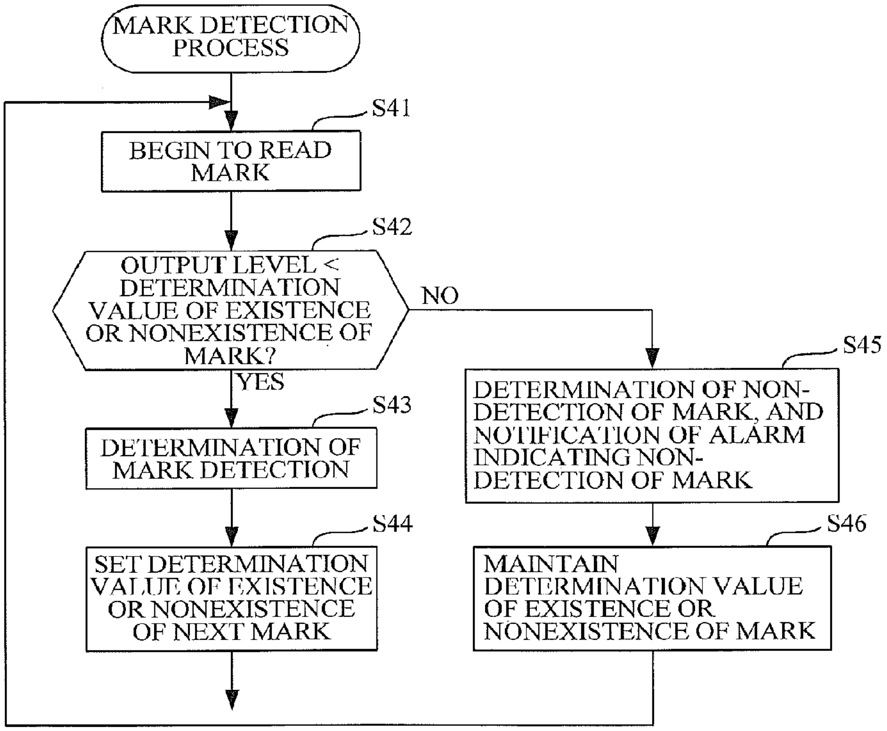
FIG. 8 is a flowchart illustrating a mark detection process of FIG. 4.

FIG. 8 is a flowchart illustrating the mark detection process of FIG. 4.

When the photo sensor 25 begins to read the mark (step S41), i.e., the output level of the photo sensor 25 begins to decrease, the MCU 36 determines whether the output level of the photo sensor 25 is less than the determination value of existence or nonexistence of the mark set in step S31 of FIG. 5 (step S42).

When the mark level is less than the determination value of existence or nonexistence of the mark (YES in step S42), the MCU 36 determines that the mark has been detected (step S43), and sets the determination value of existence or nonexistence of the next mark based on the read white level and the average value of the mark levels (step S44). Since the output level of the photo sensor 25 at the time of the reading of the central mark is less than the determination value "(V1+V2)/2" in an example of FIG. 6A, it is determined that the mark has been detected. The procedure returns to step S41. Thus, since the MCU 36 sets, i.e., updates the determination value of existence or nonexistence of the next mark at the time of mark detection, the mark detection can be performed with high accuracy even if the output level of the photo sensor 25 is changed by the shade of the mark.

When the mark level is equal to or more than the determination value of existence or nonexistence of the mark (NO in step S42), the MCU 36 determines that the mark has not been detected, and notifies the computer 2 of an alarm indicating non-detection of the mark (step S45). Since the output level of the photo sensor 25 to the right mark is not less than the determination value "(V3+V4)/2" in an example of FIG. 6A, it is determined that the mark has not been detected. Thereby, it is possible to recommend the replacement of the sheet to the user through the computer 2. In this case, the MCU 36 maintains the determination value set at the time of previous mark reading without updating the determination value of existence or nonexistence of the mark (step S46). Thereby, since the determination value of existence or nonexistence of the mark set up when a mark has been detected is used as the determination value of existence or nonexistence of the next mark, the false detection of the mark can be suppressed. The procedure returns to step S41.

By the way, the number of times of writing of the EEPROM 41 has limitation. On the other hand, the number of times of writing of the RAM 40 has no limitation.

Accordingly, when the EEPROM 41 is used as a storage medium that stores the maximum value and the minimum value of the mark levels and the determination value of existence or nonexistence of the mark, the MCU 36 sets the determination value of existence or nonexistence of the mark only at the time of the sheet replacement, or stores the determination value of existence or nonexistence of the mark to the EEPROM 41 only at the time of the sheet replacement. In this case, the determination value of existence or nonexistence of the mark set at the time of the sheet replacement is used for all the marks on the sheet. Thereby, the number of times of writing to the EEPROM 41 is suppressed.

When the RAM 40 is used as a storage medium that stores the maximum value and the minimum value of the mark levels and the determination value of existence or nonexistence of the mark, the MCU 36 sets the determination value of existence or nonexistence of the mark for each mark. In this case, the maximum value and the minimum value of the mark levels and the determination value of existence or nonexistence of the mark are updated for each mark.

In the above-mentioned embodiment, the shade of the mark is considered as a cause of changing the output level of the photo sensor 25. Hereinafter, the variation per hour of an amount of light emission of the photo sensor 25 is considered as a cause of changing the output level of the photo sensor 25.

Figure 9:
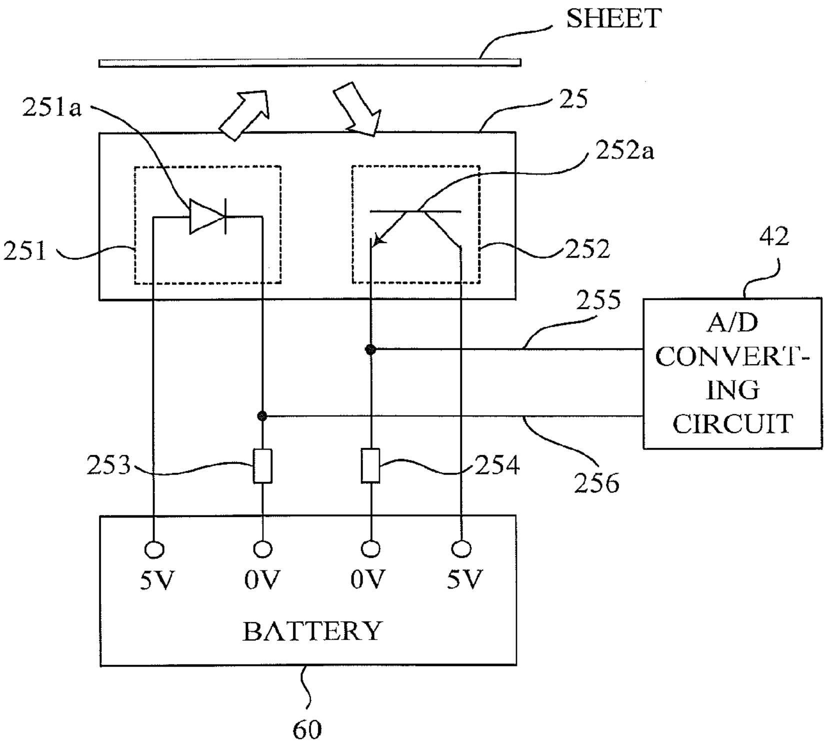
FIG. 9 is a block diagram illustrating the configuration of the photo sensor.

FIG. 9 is a block diagram illustrating the configuration of the photo sensor.

The photo sensor 25 includes a light emitting unit 251 and a light receiving unit 252. The light emitting unit 251 includes a diode 251*a*. An anode of the diode 251*a* is connected to a 5V terminal of the battery 60, and a cathode of the diode 251*a* is connected to a 0V terminal of the battery 60 via a resistance 253. The light receiving unit 252 includes a transistor 252*a*. An emitter of the transistor 252*a* is connected to a 0V terminal of the battery 60 via a resistance 254. A collector of the transistor 252*a* is connected to a 5V terminal of the battery 60.

The light emitting unit 251 emits a light to the sheet, and the light receiving unit 252 receives a reflected light from the sheet. The reflected light received by the light receiving unit 252 is outputted to the A/D converting circuit 42 via a wiring 255 as a voltage signal. The voltage signal converted by the A/D converting circuit 42 is outputted to the MCU 36 as an output level of the photo sensor.

Figure 10:
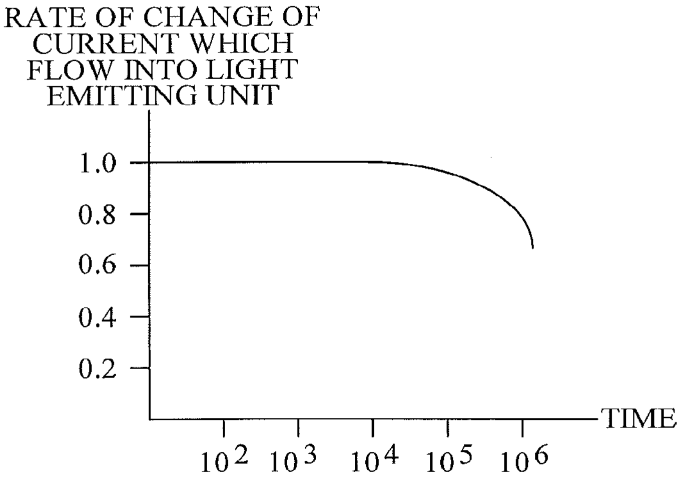
FIG. 10 is a diagram illustrating a relationship between time and a rate of change of a current which flows into a light emitting unit.

In the light emitting unit 251, the rate of change of a current which flows into the light emitting unit 251 decreases according to time progress, as illustrated in FIG. 10. The rate of change denotes a rate of the current which flows into the light emitting unit 251 when the current which firstly flows into the light emitting unit 251 is set to "1". The current which flows into the light emitting unit 251 (namely, the amount of light emission) decreases gradually according to time progress. As a result, the amount of received light decreases, the output level of the photo sensor 25 decreases, and the false detection of the mark may occur.

Therefore, in order to detect the change of the current which flows into the light emitting unit 251, as the change of the voltage, the cathode of the diode 251*a* is connected to the A/D converting circuit 42 through a wiring 256. Thereby, the MCU 36 detects reduction of the amount of light emission due to deterioration in the characteristic of the photo sensor 25, i.e., voltage drop of the light emitting unit 251, via the A/D converting circuit 42. Thereby, the MCU 36 can determine whether a cause of the change of the output level of the photo sensor 25 is the density unevenness of the mark or the deterioration in the characteristic of the photo sensor 25.

According to the present embodiment, the MCU 36 calculates the average value of the mark levels read the given number of times, calculates the permissible range in accordance with the average value. Moreover, when the mark levels read the given number of times fall within the permissible range, the MCU 36 sets the middle value between the white level and the average value as the determination value of existence or nonexistence of the next mark. When the mark level at the time of the reading of the next mark is less than the determination value of existence or nonexistence of the next mark, the MCU 36 determines that the next mark has been detected. Therefore, since the influence on the mark detection by the vibration of the sheet is removed by using the average value of the mark levels of the given number of times, and the permissible range, the mark detection can be performed with high accuracy.

Here, the above-mentioned processes about the mark detection, i.e., the setting process of the determination value of existence or nonexistence of the mark in FIG. 5 and the mark detection process in FIG. 8 can be applied to also a device other than the printer such as the thermal printer 1. For example, the setting process of the determination value of existence or nonexistence of the mark in FIG. 5 and the mark detection process in FIG. 8 can be used even if the mark is detected with OCR (Optical Character Recognition).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A printer, comprising:

a sensor;

a calculation unit that calculates an average value of mark levels and a permissible range in accordance with the average value, the mark levels being output levels of the sensor that has read a mark on a sheet a given number of times;

a setting unit that, when the mark levels read the given number of times fall within the permissible range, sets a middle value between a white level and the average value as a determination value of existence or nonexistence of a next mark, the white level being an output level of the sensor when a non-marking domain of the sheet is read; and a determination unit that determines that the next mark has been detected when a mark level at the time of reading of the next mark is less than the determination value of existence or nonexistence of the next mark.

2. The printer as claimed in claim 1, wherein when the mark level at the time of reading of the next mark is equal to or more than the determination value of existence or nonexistence of the next mark, the setting unit maintains the determination value of existence or nonexistence of the next mark.

3. The printer as claimed in claim 1, further comprising:

a first detector that detects deterioration of the sheet based on comparison between the white level and a threshold value for determining whether print quality is affected; and a notification unit that notifies an alarm indicating the deterioration of the sheet when the deterioration of the sheet is detected.

4. The printer as claimed in claim 3, wherein the notification unit notifies a maximum value and a minimum value of the mark levels read the given number of times.

5. The printer as claimed in claim 3, wherein when the mark levels read the given number of times do not fall within the permissible range, the notification unit notifies an alarm indicating that density unevenness exists.

6. The printer as claimed in claim 1, wherein when the determination value of existence or nonexistence of the next mark is stored into a storage medium which has limitation with respect to the number of times of writing, setting of the determination value of existence or nonexistence of the next mark is performed at the time of sheet replacement.

7. The printer as claimed in claim 1, wherein when the determination value of existence or nonexistence of the next mark is stored into a storage medium which has no limitation with respect to the number of times of writing, the setting of the determination value of existence or nonexistence of the next mark is performed for each mark.

8. The printer as claimed in claim 1, further comprising:

a second detector that detects existence or nonexistence of the sheet based on a threshold value for detecting the sheet, a threshold value for detecting no sheet, and an output level of the sensor.

9. The printer as claimed in claim 8, further comprising:

a changing unit that changes the threshold value for detecting the sheet, and the threshold value for detecting no sheet.

10. The printer as claimed in claim 1, wherein the sensor includes an light emitting unit that emits a light to the sheet, and the printer further comprises a third detector that detects the deterioration of the light emitting unit.

11. The printer as claimed in claim 1, further comprising:

a fourth detector that detects the deterioration of the sensor based on the history of the output level of the sensor at the time of no sheet.

12. A mark detection method, comprising:

calculating an average value of mark levels and a permissible range in accordance with the average value, the mark levels being output levels of a sensor that has read a mark on a sheet a given number of times;

setting, when the mark levels read the given number of times fall within the permissible range, a middle value between a white level and the average value as a determination value of existence or nonexistence of a next mark, the white level being an output level of the sensor when a non-marking domain of the sheet is read; and determining that the next mark has been detected when a mark level at the time of reading of the next mark is less than the determination value of existence or nonexistence of the next mark.

* * * * *